United States Patent [19]

Downey et al.

[11] 4,323,465
[45] Apr. 6, 1982

[54] STABILIZED SODIUM SULFATE-HYDROGEN PEROXIDE-SODIUM CHLORIDE ADDUCT AND ALKALINE BLEACH COMPOSITION CONTAINING SAME

[75] Inventors: Gale D. Downey, Pennington; Charles W. Lutz, Princeton, both of N.J.

[73] Assignee: FMC Corporation, Philadelphia, Pa.

[21] Appl. No.: 256,621

[22] Filed: Apr. 23, 1981

[51] Int. Cl.$^3$ ............................................. C11D 7/36
[52] U.S. Cl. ....................................... 252/102; 252/99; 252/103
[58] Field of Search ......................... 252/102, 99, 103

[56] References Cited

U.S. PATENT DOCUMENTS

| | | | |
|---|---|---|---|
| 3,308,067 | 3/1967 | Diehl | 252/99 X |
| 3,979,312 | 9/1976 | Nakagawa et al. | 252/95 X |
| 3,979,313 | 9/1976 | Nakagawa et al. | 252/99 X |
| 4,005,182 | 1/1977 | Ito et al. | 252/94 X |

*Primary Examiner*—Mayer Weinblatt
*Attorney, Agent, or Firm*—Robert D. Jackson; Eugene G. Horsky

[57] ABSTRACT

$4Na_2SO_4.2H_2O_2.NaCl$, having improved alkaline stability, is produced by crystallizing it in the presence of a stabilizing quantity of a soluble, organic polyphosphonate which is taken up in the crystalline structure of the compound.

The stabilized product is useful as a peroxygen bleaching agent in alkaline bleach systems.

19 Claims, No Drawings

STABILIZED SODIUM SULFATE-HYDROGEN PEROXIDE-SODIUM CHLORIDE ADDUCT AND ALKALINE BLEACH COMPOSITION CONTAINING SAME

This invention relates to hydrogen peroxide adducts, particularly to sodium sulfate-hydrogen peroxide-sodium chloride adduct having improved stability in alkaline bleach media.

Sodium sulfate-hydrogen peroxide-sodium chloride adduct of the formula:

$$4Na_2SO_4 \cdot 2H_2O_2 \cdot NaCl$$

is a known chemical entity which is useful as a peroxygen bleaching agent. The adduct is readily obtained by reacting in aqueous solution, sodium sulfate, sodium chloride and hydrogen peroxide. It has such desirable characteristics as fast dissolving rate and high solubility in cold water and it can be manufactured from low cost non-toxic starting materials. For a detailed description of this prodct, including its preparation and application in bleaching, reference is made to U.S. Pat. Nos. 3,979,312, 3,979,313 and 4,005,182.

Although affording generally excellent bleaching action, $4Na_2SO_4 \cdot 2H_2O_2 \cdot NaCl$ possesses the deleterious and undesirable property of being unstable in the presence of the caustic salts of the type which are contained in heavy duty bleaching systems. Such alkaline sensitivity has severely limited the utilization of $4Na_2SO_4 \cdot 2H_2O_2 \cdot NaCl$ in bleaching, at least from a commercial standpoint. Manifestly, overcoming the alkaline instability of $4Na_2SO_4 \cdot 2H_2O_2 \cdot NaCl$ would benefit the bleaching art.

It is therefore an object of the invention to provide an alkali stable $4Na_2SO_4 \cdot 2H_2O_2 \cdot NaCl$ and a method of preparing same. It is also an object of the invention to provide stable alkaline bleaching compositions and the use thereof containing said alkali stable $4Na_2SO_4 \cdot 2H_2O_2 \cdot NaCl$. Other objects and purposes will be made manifest subsequently herein.

In accordance with the invention, the aforesaid objects are realized by incorporating a soluble organic polyphosphonate in the crystalline structure of $4Na_2SO_4 \cdot 2H_2O_2 \cdot NaCl$ and using the resulting alkali stable adduct as a peroxygen bleach agent in an alkaline bleaching system.

The alkali stable $4Na_2SO_4 \cdot 2H_2O_2 \cdot NaCl$ is conveniently produced by crystallizing the adduct in the presence of the polyphosphonate. Except for the presence of the polyphosphonate, the $4Na_2SO_4 \cdot 2H_2O_2 \cdot NaCl$ is prepared and crystallized in the known manner. In general, the reaction is carried out by combining sodium sulfate with hydrogen peroxide, in an aqueous solution, at a temperature of from 0° to 50° C. in the presence of sodium chloride, wherein the concentration of hydrogen peroxide in the reaction system is from 70 to 800 g/l and the concentration of sodium chloride is from 20 to 300 g/l, and recovering the crystalline solid from the reaction system. Introduction of the polyphosphonate can be made at any convenient time during the preparation provided it is present during crystallization of the $4Na_2SO_4 \cdot 2H_2O_2 \cdot NaCl$.

So far as can be ascertained, the polyphosphonate must be incorporated in the crystalline structure of the $4Na_2SO_4 \cdot 2H_2O_2 \cdot NaCl$ in order to render it stable to alkalies: merely adding the polyphosphonate to the preformed adduct is ineffective. Apparently, the polyphosphonate alters or in some manner influences the crystalline habit of the $4Na_2SO_4 \cdot 2H_2O_2 \cdot NaCl$ as to render it insensitive to alkalies. In this connection, microscopic examination reveals differences in the crystalline configuration between the phosphonate-treated $4Na_2SO_4 \cdot 2H_2O_2 \cdot NaCl$ and a control specimen, yet no differences in x-ray diffraction patterns are evident. On the other hand, preparations with the stabilizing additive have improved thermal stability as the decomposition temperature of the stabilized samples is 220° C. as compared to 180° C or less for unstabilized samples of $4Na_2SO_4 \cdot 2H_2O_2 \cdot NaCl$.

Polyphosphonates which have been found effective for stabilizing $4Na_2SO_4 \cdot 2H_2O_2 \cdot NaCl$ are those having two or more $-PO_3{-}{-}$ functions connected through their phosphorus atoms by way of an alkylene chain, optionally interrupted by a nitrogen atom or containing a hydroxyl substituent. As understood herein, the term polyphosphonate includes the free acid and salts thereof. Exemplary polyphosphonates are the following polyphosphonic acids or their alkali metal salts:

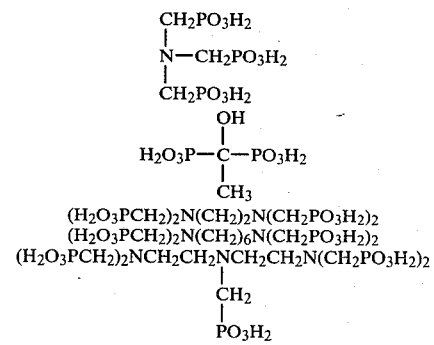

The amount of polyphosphonate found to be effective in stabilizing $4Na_2SO_4 \cdot 2H_2O_2 \cdot NaCl$ is quite small relative to the adduct itself. Of course, the molecular weight of the polyphosphonate as well as the number of phosphonate functions will influence the degree of stabilization attained, some members of the class being more effective than others. In general, it has been found that $4Na_2SO_4 \cdot 2H_2O_2 \cdot NaCl$ containing from about 0.001 to about 2.0% of a soluble polyphosphonate, based on the weight of the composition, imparts sufficient stability to the adduct whereby it can be used as the peroxygen bleaching component in heavy duty bleaches and detergents.

Alkaline bleach compositions containing the stabilized $4Na_2SO_4 \cdot 2H_2O_2 \cdot NaCl$ of the invention are typical of peroxygen bleach systems prepared in the known manner. The essential ingredients are a peroxygen bleaching agent and an alkaline component to provide an aqueous bleach solution having a pH in excess of 8, preferably in the neighborhood of 10.6. Buffering agents may be necessary to maintain the requisite pH conditions. Buffering agents suitable for use herein include any non-interfering compound which can alter and/or maintain the solution pH within the desired range, and the selection of such buffers can be made by referring to a standard text. For instance, phosphates, carbonates, or bicarbonates, which buffer within the pH range of 8 to 12 are useful. Examples of suitable buffering agents include sodium bicarbonate, sodium carbonate, sodium silicate, disodium hydrogen phosphate, sodium dihydrogen phosphate. The bleach solution may also contain a detergent agent where bleaching and laundering of the fabric is carried out simultaneously. The strength of the detergent agent is commonly about 0.05% to 0.20% (wt.) in the wash water.

Although the herein stabilized $4Na_2SO_4.2H_2O_2.NaCl$ can be employed generally in alkaline bleaching, the adduct is conveniently included as a peroxygen bleaching agent in heavy duty, alkaline cleansing compositions. Typically, these contain on a 100% basis by weight (a) about 3% to about 70% of the herein stabilized $4Na_2SO_4.2H_2O_2.NaCl$; (b) about 30% to about 80% of an alkaline inorganic builder salt; (c) about 0% to about 20% of a surfactant; (d) about 0% to about 50% of a neutral or alkaline salt as a filler. The composition may contain about 0% to about 2% of various optional materials commonly added to laundering and cleansing compositions. Such adjuncts as perfumes, optical brighteners, fillers, anti-caking agents, fabric softeners, and the like can be present to provide the usual benefits occasioned by the use of such materials in detergent compositions. Enzymes, especially the thermally stable proteolytic and lipolytic enzymes used in laundry detergents, also can be dry-mixed in the compositions herein.

Surfactants suitable for use in accordance with the present invention encompass a relatively wide range of materials and may be of the anionic, nonionic, cationic or amphoteric types.

The anionic surface active agents include those surface active or detergent compounds which contain an organic hydrophobic group and an anionic solubilizing group. Typical examples of anionic solubilizing groups are sulfonate, sulfate, carboxylate, phosphonate and phosphate. Examples of suitable anionic detergents which fall within the scope of the invention include the soaps, such as the water-soluble salts of higher fatty acids or rosin acids, such as may be derived from fats, oils, and waxes of animal, vegetable or marine origin, for example, the sodium soaps of tallow, grease, coconut oil, tall oil and mixtures thereof; and the sulfated and sulfonated synthetic detergents, particularly those having about 8 to 26, and preferably about 12 to 22, carbon atoms to the molecule.

As examples of suitable synthetic anionic detergents the higher alkyl mononuclear aromatic sulfonates are preferred, particularly the LAS type such as the higher alkyl benzene sulfonates containing from 10 to 16 carbon atoms in the alkyl group, for example, the sodium salts such as decyl, undecyl, dodecyl(lauryl), tridecyl, tetradecyl, pentadecyl, or hexadecyl benzene sulfonate and the higher alkyl toluene, xylene and phenol sulfonates; alkyl naphthalene sulfonate, ammonium diamyl naphthalene sulfonate, and sodium dinonyl naphthalene sulfonate.

Other anionic detergents are the olefin sulfonates, including long chain alkene sulfonates, long chain hydroxyalkane sulfonates or mixtures of alkenesulfonates and hydroxyalkanesulfonates. These olefin sulfonate detergents may be prepared, in known manner, by the reaction of $SO_3$ with long chain olefins (of 8–25 preferably 12–21 carbon atoms) of the formula $RCH=CHR_1$, where R is alkyl and $R_1$ is alkyl or hydrogen, to produce a mixture of sultones and alkenesulfonic acids, which mixture is then treated to convert the sultones to sulfonates. Examples of other sulfate or sulfonate detergents are paraffin sulfonates, such as the reaction products of alpha olefins and bisulfites (for example, sodium bisulfite), for example, primary paraffin sulfonates of about 10–20 preferably about 15–20 carbon atoms; sulfates of higher alcohols; salts of α-sulfofatty esters (for example, of about 10–20 carbon atoms, such as methyl α-sulfomyristate or α-sulfotallowate).

Examples of sulfates of higher alcohols are sodium lauryl sulfate, sodium tallow alcohol sulfate; Turkey Red Oil or other sulfated oils, or sulfates of mono- or diglycerides of fatty acids (for example, stearic monoglyceride monosulfate), alkyl poly(ethenoxy) ether sulfates such as the sulfates of the condensation products of ethylene oxide and lauryl alcohol (usually having 1 to 5 ethenoxy groups per molecule); lauryl or other higher alkyl glyceryl ether sulfates; aromatic poly(ethenoxy) ether sulfates such as the sulfates of the condensation products of ethylene oxide and nonyl phenol (usually having 1 to 20 oxyethylene groups per molecule, preferably 2–12).

The suitable anionic detergents include also the acyl sarcosinates (for example, sodium lauroylsarcosinate), the acyl ester (for example, oleic acid ester) of isethionates, and the acyl N-methyl taurides (for example, potassium N-methyl lauroyl or oleyl tauride).

Other highly preferred water-soluble anionic detergent compounds are the ammonium and substituted ammonium (such as mono-, di- and triethanolamine), alkali metal (such as sodium and potassium) and alkaline earth metal (such as calcium and magnesium) salts of the higher alkyl sulfates, and the higher fatty acid monoglyceride sulfates. The particular salt will be suitably selected depending upon the particular formulation and the proportions therein.

Nonionic surface active agents include those surface active or detergent compounds which contain an organic hydrophobic group and a hydrophilic group which is a reaction product of a solubilizing group such as carboxylate, hydroxyl, amido or amino with ethylene oxide or polyethylene glycol.

As examples of nonionic surface active agents which may be used there may be noted the condensation products of alkyl phenols with ethylene oxide, for example, the reaction product of octyl phenol with about 6 to 30 ethylene oxide units; condensation products of alkyl thiophenols with 10 to 15 ethylene oxide units; condensation products of higher fatty alcohols such as tridecyl alcohol with ethylene oxide; ethylene oxide condensates of monoesters of hexahydric alcohols and inner ethers thereof such as sorbitol monolaurate, sorbitol mono-oleate and mannitol monopalmitate, and the condensation products of polypropylene glycol with ethylene oxide.

Cationic surface active agents may also be employed. Such agents are those surface active detergent compounds which contain an organic hydrophobic group and a cationic solubilizing group. Typical cationic solubilizing groups are amine and quaternary groups.

As examples of suitable synthetic cationic detergents there may be noted the diamines such as those of the type $RNHC_2H_4NH_2$ wherein R is an alkyl group of about 12 to 22 carbon atoms, such as N—2—aminoethyl stearyl amine and N-2-amino-ethyl myristyl amine; amide-linked amines such as those of the type $R_1CONHC_2H_4NH_2$ wherein R is an alkyl group of about 9 to 20 carbon atoms, such as N-2-amino ethyl stearyl amide and N-amino ethyl myristyl amide; quaternary ammonium compounds wherein typically one of the groups linked to the nitrogen atom are alkyl groups which contain 1 to 3 carbon atoms, including such 1 to 3 carbon alkyl groups bearing inert substituents such as phenyl groups, and there is present an anion such as halide, acetate, methosulfate, etc. Typical quaternary ammonium detergents are ethyl-dimethyl-stearyl ammonium chloride, benzyl-dimethyl-stearyl ammonium chloride, benzyl-dimethyl-stearyl ammonium chloride, trimethyl stearyl ammonium chloride, trimethylacetyl ammonium bromide, dimethyl ethyl dilauryl ammonium chloride, dimethyl-propyl-myristyl ammonium chloride, and the corresponding methosulfates and acetates.

Examples of suitable amphoteric detergents are those containing both an anionic and a cationic group and a hydrophobic organic group, which is advantageously a higher aliphatic radical, for example, of 10–20 carbon atoms. Among these are the N-long chain alkyl aminocarboxylic acids, for example, of the formula:

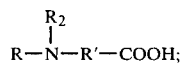

the N-long chain alkyl iminodicarboxylic acids (for example, of the formula RN(R'COOH)₂) and the N-long chain alkyl betaines, for example, of the formula:

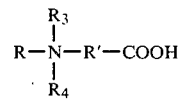

where R is a long chain alkyl group, for example, of about 10–20 carbons, R' is a divalent radical joining the amino and carboxyl portions of an amino acid (for example, an alkylene radical of 1–4 carbon atoms), H is hydrogen or a salt-forming metal, $R_2$ is a hydrogen or another monovalent substituent (for example, methyl or other lower alkyl), and $R_3$ and $R_4$ are monovalent substituents joined to the nitrogen by carbon-to-nitrogen bonds (for example, methyl or other lower alkyl substituents). Examples of specific amphoteric detergents are N-alkyl-beta-amino-propionic acid; N-alkyl-beta-iminodipropionic acid, and N-alkyl, N,N-dimethyl glycine; the alkyl group may be, for example, that derived from coco fatty alcohol, lauryl alcohol, myristyl alcohol (or a lauryl-myristyl mixture), hydrogenated tallow alcohol, cetyl, stearyl, or blends of such alcohols. The substituted aminopropionic and iminodipropionic acids are often supplied in the sodium or other salt forms, which may likewise be used in the practice of this invention. Examples of other amphoteric detergents are the fatty imidazolines such as those made by reacting a long chain fatty acid (for example, of 10 to 20 carbon atoms) with diethylene triamine and monohalocarboxylic acids having 2 to 6 carbon atoms, for example, 1-coco-5-hydroxyethyl-5-carboxy-methyl-imidazoline; betaines containing a sulfonic group instead of the carboxylic group; betaines in which the long chain substituent is joined to the carboxylic group without an intervening nitrogen atom, for example, inner salts of 2-trimethylamino fatty acids such as 2-trimethylaminolauric acid, and compounds of any of the previously mentioned types but in which the nitrogen atom is replaced by phosphorus.

The instant compositions contain a detergency builder of the type commonly added to detergent formulations. Useful builders herein include any of the conventional inorganic and organic water-soluble builder salts. Inorganic detergency builders useful herein include, for example, water-soluble salts of phosphates, pyrophosphates, orthophosphates, polyphosphates, metaphosphates, silicates, carbonates, zeolites, including natural and synthetic and the like. Specific examples of inorganic phosphate builders include sodium and potassium tripolyphosphates, pyrophosphates, orthophosphates, and hexametaphosphates. Sodium tripolyphosphate is an especially preferred, water-soluble inorganic builder herein.

Non-phosphorus containing sequestrants can also be selected for use herein as detergency builders. Specific examples of non-phosphorus, inorganic builder ingredients include water-soluble inorganic carbonate, bicarbonate, and silicate salts. The alkali metal, for example, sodium and potassium, carbonates, bicarbonates, and silicates are particularly useful herein.

Water-soluble, organic builders are also useful herein. For example, the alkali metal, ammonium and substituted ammonium polyacetates, carboxylates, polycarboxylates and polyhydroxysulfonates are useful builders in the present compositions and processes. Specific examples of the polyacetate and polycarboxylate builder salts include sodium, potassium, lithium, ammonium and substituted ammonium salts of ethylenediaminetetraacetic acid, nitrilotriacetic acid, oxydisuccinic acid, mellitic acid, benzene polycarboxylic (that is, penta- and tetra-) acids, carboxymethoxysuccinic acid and citric acid.

Highly preferred non-phosphorus builder materials (both organic and inorganic) herein include sodium carbonate, sodium bicarbonate, sodium silicate, sodium citrate, sodium oxydisuccinate, sodium mellitate, sodium nitrilotriacetate, and sodium ethylenediaminetetraacetate, and mixtures thereof.

Other preferred organic builders herein are the polycarboxylate builders set forth in U.S. Pat. No. 3,308,067, incorporated herein by reference. Examples of such materials include the water-soluble salts of homo- and copolymers of aliphatic carboxylic acids such as maleic acid, itaconic acid, mesaconic acid, fumaric acid, aconitric acid, citraconic acid and methylenemalonic acid.

The builders aforesaid, particularly the inorganic types, can function as buffers to provide the requisite alkalinity for the bleaching solution. Where the builder does not exhibit such buffer activity, an alkaline reacting salt can be incorporated in the formulation.

The neutral inorganic salt in the compositions of the invention is normally a water-soluble, alkali metal salt such as sodium chloride and sodium sulfate, the latter being especially preferred. Alkali inorganic salts are generally of the class alkali metal carbonates with sodium carbonate being the preferred member.

An activating agent can also be included among the ingredients of the herein compositions and in this connection reference is made to those activators capable of reacting with hydrogen peroxide in an aqueous solution and thus forming an organic peracid, for example, O-acylated products such as glucose pentaacetate, octaacetylated sucrose, triacetin, acetoxybenzenesulfonates and triacetylcyanurate, N-acylated products such as tetraacetylethylenediamine and tetraacetylglycoluril, and acid anhydrides such as phthalic anhydride and succinic anhydride, and mixtures of activating agents.

The mixing ratio of the activating agent to the hydrogen-peroxide adduct of the formula (1), $4Na_2SO_4 \cdot 2H_2O_2 \cdot NaCl$, is not critical in this invention, but in general, the mixing ratio of activating agent/adduct is from 99/1 to 1/99, preferably from 7/3 to 1/20 parts by weight.

When employing an activator for the $4Na_2SO_4.2H_2O_4.NaCl$, the combined sum of these in the bleaching formulation aforesaid is from about 25% to about 70% by weight.

Sufficient $4Na_2SO_4.2H_2O_2.NaCl$ to provide from about 2 ppm to about 2000 ppm active oxygen in solution is used. For home bleaching applications, the concentration of active oxygen in the wash water is desirably from about 5 to 100 ppm, preferably about 15 to 60 ppm. The actual concentration employed in a given bleaching solution can be varied widely, depending on the intended use of the solution.

Reference is now made to the following non-limiting examples.

EXAMPLE 1

$4Na_2SO_4.2H_2O_2.NaCl$ was prepared by evaporating under reduced pressure at room temperature a 20% $H_2O_2$ solution containing 28% $Na_2SO_4$, 3% NaCl and 0.03% nitrilo tris(methylene) triphosphonic acid (DEQUEST®2000) until only a crystalline product remained. This product was then dried at room temperature after which it was dry blended with a spray dried alkaline detergent base to give a bleach formulation having the following ingredients:

20% $4Na_2SO_4.2H_2O_2.NaCl$
38% Sodium Carbonate
14% Sodium Linear Alkyl($C_{12}$average)benzene Sulfonate (LAS)
14% Sodium Silicate
8% Sodium Sulfate
5% Moisture
1% Carboxymethylcellulose (CMC)

EXAMPLE 2

$4Na_2SO_4.2H_2O_2.NaCl$ was prepared by sequentially adding 9 g of NaCl and 190 g of $Na_2SO_4$ to 250 ml of 31% $H_2O_2$ solution containing 0.045% nitrilo tris(methylene) triphosphonic acid (DEQUEST®2000). The solution was then stirred for 30 minutes at 25° C., filtered and the adduct dried at ambient conditions and then dry blended in the bleach formulation of Example 1.

EXAMPLE 3

The procedure of Example 2 was repeated except the polyphosphonic acid was hydroxyethylidene-1,1-diphosphonic acid (DEQUEST®2010) at a concentration of 0.065% in the reaction solution.

EXAMPLE 4

$4Na_2SO_4.2H_2O_2.NaCl$ was prepared by evaporating under ambient conditions 400 ml of 20% $H_2O_2$ solution containing 200 g $Na_2SO_4$, 20 g NaCl and 0.10% nitrilo tris(methylene) triphosphonic acid (DEQUEST®2000). After sufficient product crystals had formed, the solution was filtered, the recovered product dried at ambient conditions and dry blended in the bleach formulation of Example 1.

EXAMPLE 5

$4Na_2SO_4.2H_2O_2.NaCl$ was prepared by evaporating at ambient temperatures 170 ml of 30% $H_2O_2$ containing 0.13% nitrilo tris(methylene)triphosphonic acid (DEQUEST®2000) to which 5.9 g NaCl and 50 g $Na_2SO_4$ was added. The product crystals were filtered off, dried at ambient conditions and then dry blended in the bleach formulation of Example 1.

Storage Stability

The alkaline bleach formulations of the examples containing the polyphosphonate treated $4Na_2SO_4.2H_2O_2.NaCl$ of the invention were tested for storage stability. The procedure used is known as the accelerated storage stability test. This consists of placing the test formulation in a 4 oz. jar provided with a semipermeable closure and allowing the containers to stand at about 40° to 50° C. and about 90% R.H. for a period of 5 days. The formulations were then assayed to determine their active oxygen content.

A set of comparison formulations, prepared identically to the examples except for the polyphosphonate, were likewise included in the storage stability testing. The test results on the examples and comparison formulations are set forth in Table I. As is readily apparent, the bleaching composition containing the polyphosphonate stabilized $4Na_2SO_4.2H_2O_2.NaCl$ bleaching agent of the invention exhibits superior storage stability compared to like compositions containing $4Na_2SO_4.2H_2O_2.NaCl$ without the polyphosphonate treatment. It will be noted that Examples 1, 4 and 5 show particularly high storage stability. This is believed to be attributable to the fact that in these examples, the $4Na_2SO_4.2H_2O_2.NaCl$ was crystallized more slowly in the presence of the polyphosphonate than in the other examples.

TABLE I

STORAGE STABILITY RESULTS

| Example No. | Polyphosphonate Additive | % A.O. Remaining In Bleach Mixture After Storage | Accelerated Storage Test Conditions: 5 Days in Semi-Permeable Containers at |
|---|---|---|---|
| 1 | DEQUEST® 2000 | 87% | 49° C., 90% R.H. |
| Comp. | None | 7% | 49° C., 90% R.H. |
| 2 | DEQUEST® 2000 | 22% | 41° C., 86% R.H. |
| Comp. | None | 4% | 41° C., 86% R.H. |
| 3 | DEQUEST® 2010 | 20% | 41° C., 86% R.H. |
| Comp. | None | 4% | 41° C., 86% R.H. |
| 4 | DEQUEST® 2000 | 73% | 49° C., 90% R.H. |
| Comp. | None | 38% | 49° C., 90% R.H. |
| 5 Comp. | DEQUEST® 2000 | 88% | 41° C., 86% R.H. |

A.O. = Active Oxygen

What is claimed is:

1. A $4Na_2SO_4.2H_2O_2.NaCl$ composition, having improved storage stability in alkaline formulations, comprising $4Na_2SO_4.2H_2O_2.NaCl$ having incorporated in its crystalline structure a stabilizing amount of an organic polyphosphonate compound wherein the polyphosphonate compound contains 2 or more —$PO_3$— — functions connected through their phosphorous atoms by way of an alkylene chain optionally interrupted by a nitrogen atom or containing a hydroxy substituent.

2. The composition of claim 1 wherein the polyphosphonate is:

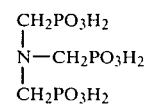

or an alkali metal salt thereof.

3. The composition of claim 1 wherein the polyphosphonate is:

$$H_2O_3P-\underset{\underset{CH_3}{|}}{\overset{\overset{OH}{|}}{C}}-PO_3H_2$$

or an alkali metal salt thereof.

4. The composition of claim 1 wherein the polyphosphonate is:

$(H_2O_3PCH_2)_2N(CH_2)_2N(CH_2PO_3H_2)_2$ or an alkali metal salt thereof.

5. The composition of claim 1 wherein the polyphosphonate is:

$(H_2O_3PCH_2)_2N(CH_2)_6N(CH_2PO_3H_2)_2$ or an alkali metal salt thereof.

6. The composition of claim 1 wherein the polyphosphonate is:

$$(H_2O_3PCH_2)_2NCH_2CH_2\underset{\underset{PO_3H_2}{|}}{\overset{\overset{}{|}}{N}}CH_2CH_2N(CH_2PO_3H_2)_2$$
$$\phantom{xxxxxxxxxxxxxxxxxx}CH_2$$

or an alkali metal salt thereof.

7. An alkaline detergent composition having a pH in excess of 8 when dissolved in aqueous media, comprising (a) about 3% to about 70% of the polyphosphonate stabilized $4Na_2SO_4.2H_2O_2.NaCl$ of claim 1; (b) about 10% to about 80% of a detergent builder; (c) about 0% to about 20% of a surfactant and (d) about 0% to about 50% of a neutral or alkaline filler salt.

8. The detergent composition of claim 7 wherein the $4Na_2SO_4.2H_2O_2.NaCl$ is stabilized with the polyphosphonate of claim 1.

9. The detergent composition of claim 7 wherein the $4Na_2SO_4.2H_2O_2.NaCl$ is stabilized with the polyphosphonate of claim 2.

10. The detergent composition of claim 7 wherein the $4Na_2SO_4.2H_2O_2.NaCl$ is stabilized with the polyphosphonate of claim 3.

11. The detergent composition of claim 7 wherein the $4Na_2SO_4.2H_2O_2.NaCl$ is stabilized with the polyphosphonate of claim 4.

12. The detergent composition of claim 7 wherein the $4Na_2SO_4.2H_2O_2.NaCl$ is stabilized with the polyphosphonate of claim 5.

13. The detergent composition of claim 7 wherein the $4Na_2SO_4.2H_2O_2.NaCl$ is stabilized with the polyphosphonate of claim 6.

14. An alkaline peroxygen bleach composition having a pH in excess of 8 when dissolved in aqueous media wherein the peroxygen bleaching agent in the composition is $4Na_2SO_4.2H_2O_2.NaCl$ having incorporated in the crystalline structure thereof an effective amount of an organic polyphosphonate wherein the polyphosphonate contains 2 or more $-PO_3--$ functions connected through their phosphorous atoms by way of an alkylene chain optionally interrupted by a nitrogen atom or containing a hydroxy substituent to stabilize the $4Na_2SO_4.2H_2O_2.NaCl$ in said alkaline bleach composition.

15. The bleach composition of claim 14 wherein the polyphosphonate is:

$$\underset{\underset{CH_2PO_3H_2}{|}}{\overset{\overset{CH_2PO_3H_2}{|}}{N}}-CH_2PO_3H_2$$

or an alkali metal salt thereof.

16. The bleach composition of claim 14 wherein the polyphosphonate is:

$$H_2O_3P-\underset{\underset{CH_3}{|}}{\overset{\overset{OH}{|}}{C}}-PO_3H_2$$

or an alkali metal salt thereof.

17. The bleach composition of claim 14 wherein the polyphosphonate is:

$(H_2O_3PCH_2)_2N(CH_2)_2N(CH_2PO_3H_2)_2$ or an alkali metal salt thereof.

18. The bleach composition of claim 14 wherein the polyphosphonate is:

$(H_2O_3PCH_2)_2N(CH_2)_6N(CH_2PO_3H_2)_2$ or an alkali metal salt thereof.

19. The bleach composition of claim 14 wherein the polyphosphonate is:

$$(H_2O_3PCH_2)_2NCH_2CH_2\underset{\underset{PO_3H_2}{|}}{\overset{\overset{}{|}}{N}}CH_2CH_2N(CH_2PO_3H_2)_2$$
$$\phantom{xxxxxxxxxxxxxxxxxx}CH_2$$

or an alkali metal salt thereof.

* * * * *